United States Patent
Laricchia et al.

(10) Patent No.: US 9,283,496 B2
(45) Date of Patent: Mar. 15, 2016

(54) PROCESS FOR SEPARATING AT LEAST ONE AMINE FROM ONE OR MORE HYDROCARBONS, AND APPARATUS RELATING THERETO

(71) Applicant: UOP, LLC, Des Plaines, IL (US)

(72) Inventors: Luigi Laricchia, Arlington Heights, IL (US); Javier Rios, Montgomery, IL (US)

(73) Assignee: UOP LLC, Des Plaines, IL (US)

( * ) Notice: Subject to any disclaimer, the term of this patent is extended or adjusted under 35 U.S.C. 154(b) by 220 days.

(21) Appl. No.: 13/920,507

(22) Filed: Jun. 18, 2013

(65) Prior Publication Data

US 2014/0371507 A1    Dec. 18, 2014

(51) Int. Cl.
| | | |
|---|---|---|
| *B01D 17/04* | (2006.01) | |
| *B01D 17/02* | (2006.01) | |
| *B01D 53/14* | (2006.01) | |
| *B01D 53/18* | (2006.01) | |

(52) U.S. Cl.
CPC .......... *B01D 17/045* (2013.01); *B01D 17/0211* (2013.01); *B01D 17/0214* (2013.01); *B01D 53/1425* (2013.01); *B01D 53/1462* (2013.01); *B01D 53/18* (2013.01); *B01D 2252/20478* (2013.01); *B01D 2256/24* (2013.01)

(58) Field of Classification Search
None
See application file for complete search history.

(56) References Cited

U.S. PATENT DOCUMENTS

| | | | |
|---|---|---|---|
| 2,230,654 | A | 2/1941 | Plunkett |
| 2,594,311 | A | 4/1952 | Johnson et al. |
| 2,726,992 | A | 12/1955 | Easthagen et al. |
| 4,199,440 | A | 4/1980 | Verachtert |
| 4,208,541 | A | 6/1980 | McClure |
| 4,336,233 | A | 6/1982 | Appl et al. |
| 4,461,749 | A | 7/1984 | Thorn |
| 4,490,246 | A | 12/1984 | Verachtert |
| 4,562,300 | A | 12/1985 | LaFoy |
| 4,626,341 | A | 12/1986 | Verachtert |
| 4,666,689 | A | 5/1987 | Maple et al. |
| 4,735,704 | A | 4/1988 | Kister et al. |
| 4,808,765 | A | 2/1989 | Pearce et al. |
| 4,957,715 | A | 9/1990 | Grover et al. |
| 5,149,340 | A | 9/1992 | Waycuilis |
| 5,246,619 | A | 9/1993 | Niswander |
| 5,456,661 | A | 10/1995 | Narciso, Jr. |
| 5,601,702 | A | 2/1997 | Yan |
| 5,877,386 | A | 3/1999 | Schubert |

(Continued)

FOREIGN PATENT DOCUMENTS

| | | |
|---|---|---|
| EP | 0227259 A1 | 7/1987 |
| GB | 815193 | 6/1959 |
| WO | 2005121279 | 12/2005 |

OTHER PUBLICATIONS

"New Developments . . . Coalescers Eliminate Gasoline Haze", Hydrocarbon Processing, Feb. 2001, vol. 80, No. 2, pp. 118, 124.

Doran et al., "Removal of Trace H2S and COS from Liquid Streams", Petroleum Technology Quarterly, Autumn 1996, pp. 41-44.

Pai et al., "Gas Processing Options for Mercaptans and Carbonyl Sulfide Removal from NG and NGL Streams", AIChE 1993 Spring National Meeting Presentation paper, Mar. 28, 1993, No. Preprint N.75g, pp. 25 pages.

(Continued)

*Primary Examiner* — Tam M Nguyen
(74) *Attorney, Agent, or Firm* — James C. Paschall

(57) ABSTRACT

One exemplary embodiment can be a process for separating at least one amine from one or more hydrocarbons for regenerating the at least one amine. The process can include passing the at least one amine after contacting with the one or more hydrocarbons from a first vessel to a second vessel. Often, the second vessel includes one or more walls surrounding one or more baffles and contains at least one coalescing zone.

18 Claims, 1 Drawing Sheet

(56) References Cited

U.S. PATENT DOCUMENTS

| | | | |
|---|---|---|---|
| 5,997,731 | A | 12/1999 | Suarez |
| 6,334,949 | B1 | 1/2002 | Bruno et al. |
| 6,852,144 | B1 | 2/2005 | Wagner et al. |
| 7,119,244 | B2 | 10/2006 | Smith, Jr. |
| 7,223,332 | B1 | 5/2007 | Tertel |
| 7,326,333 | B2 | 2/2008 | Laricchia et al. |
| 7,381,309 | B1 | 6/2008 | Laricchia et al. |
| 7,604,724 | B2 | 10/2009 | Mortson |
| 7,875,185 | B2 | 1/2011 | Zhang |
| 8,028,975 | B2 | 10/2011 | Tertel et al. |
| 8,080,087 | B2 | 12/2011 | Falkiner et al. |
| 8,088,281 | B2 | 1/2012 | Falkiner et al. |
| 8,173,856 | B2 | 5/2012 | Tertel |
| 8,308,957 | B2 | 11/2012 | Zhang et al. |
| 8,313,718 | B2 | 11/2012 | Bedell |
| 2009/0134068 | A1 | 5/2009 | Falkiner et al. |
| 2009/0151237 | A1 | 6/2009 | Takegoshi et al. |
| 2011/0142738 | A1 | 6/2011 | Pandya et al. |
| 2012/0000827 | A1 | 1/2012 | Krupa et al. |

OTHER PUBLICATIONS

McClure et al., "Amine Process Removes COS from Propane Economically", The Oil and Gas Journal, Jul. 2, 1979, vol. 77, No. 27, pp. 106-108.

Nielsen et al., "Treat LPGs with Amines", Hydrocarbon Processing, Sep. 1997, vol. 76, No. 9, pp. 49-50, 53-54, 56, 58-59.

"Coalescer Removes Dispersed, Nondissolved Liquid Contaminants", Chemical Engineering Progress, Apr. 2001, vol. 97, No. 4, p. 27.

Weber et al., "The Cosden/Malaprop Process for Light Hydrocarbon Desulfurization", National Petroleum Refiners Association 1981 NPRA Annual Meeting Presentation, Mar. 29-31, 1981, No. PAP.N. AM-81-49, p. 14 pages.

Wines et al., "Difficult Liquid—High-Performance, Polymer-Fiber Coalescers Break Up Hard-to-Handle Emulsions and Dispersions", Chemical Engineering, vol. 104, No. 12, Dec. 1997, pp. 104-109.

U.S. Appl. No. 13/920,407, filed Jun. 18, 2013, Laricchia.
U.S. Appl. No. 13/920,432, filed Jun. 18, 2013, Laricchia.
U.S. Appl. No. 13/920,477, filed Jun. 18, 2013, Laricchia.
U.S. Appl. No. 13/920,532, filed Jun. 18, 2013, Laricchia.

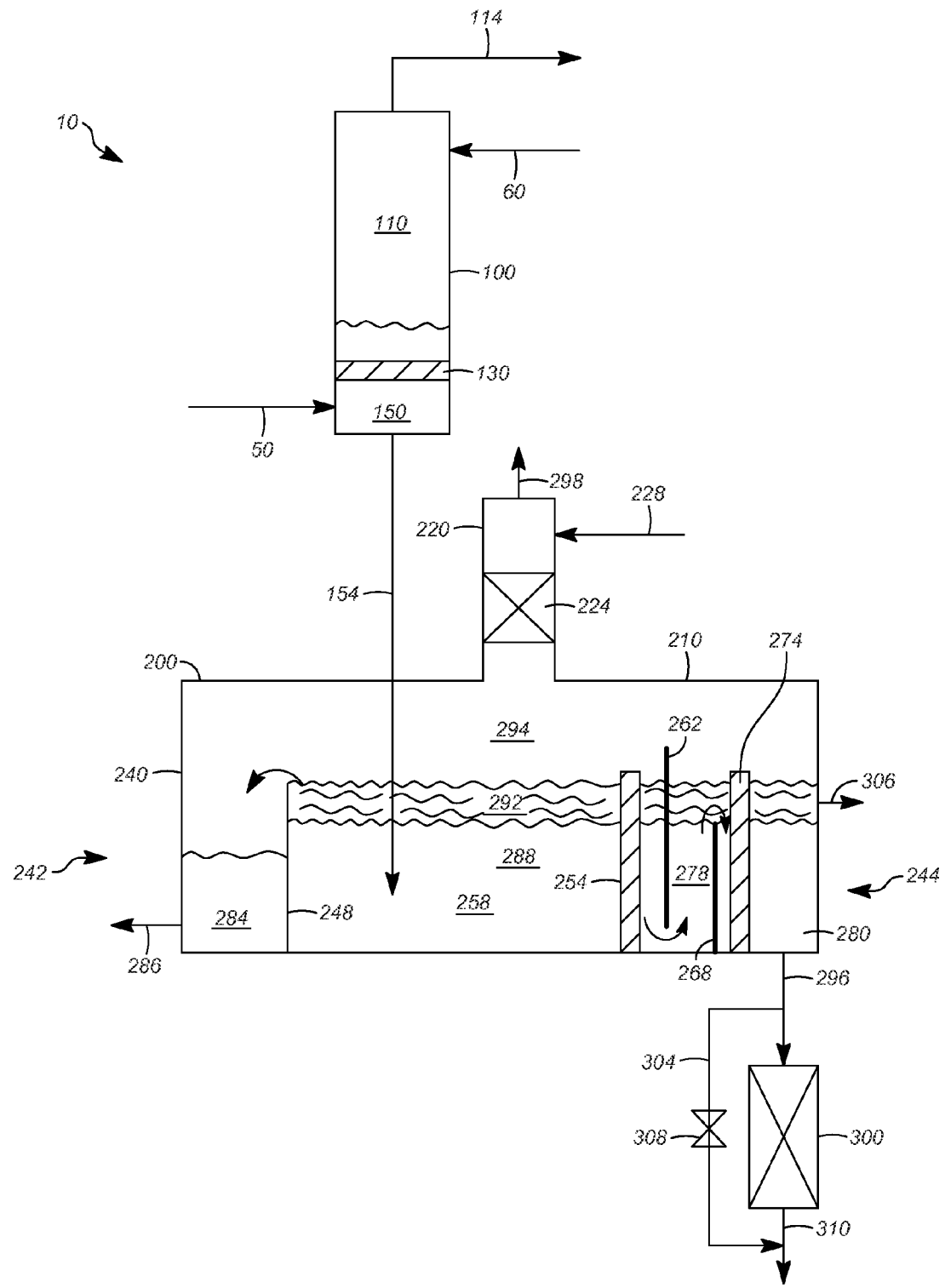

PROCESS FOR SEPARATING AT LEAST ONE AMINE FROM ONE OR MORE HYDROCARBONS, AND APPARATUS RELATING THERETO

FIELD OF THE INVENTION

This invention generally relates to a process for separating at least one amine from one or more hydrocarbons for regenerating the at least one amine, and an apparatus relating thereto.

DESCRIPTION OF THE RELATED ART

Amine carryover and amine solubility in hydrocarbons, such as fuel gas and liquefied petroleum gas, can cause amine loss and major upsets in caustic extraction and downstream units. When mixed with caustic solutions, amines may cause emulsions in hydrocarbons resulting in off-specification product, high caustic consumption, corrosion of carbon steel in a vapor phase of a separator, and loss of production due to the necessity of operating at lower hydrocarbon flow rates. It would be desirable to eliminate these problems by making the hydrocarbon streams entering the extraction unit amine free. Often, the amine carryover is accentuated when processing liquefied petroleum gas derived from fluid catalytic cracking and coker units, which may result in emulsions in the circulating amine, gums across the amine stripper, and amine carryover in the extraction and downstream units. Rich amine flash drums can aid in removing entrained hydrocarbons from the amine; however, such devices typically provide insufficient separation. Hence, there is a desire to provide a suitable amine process that can provide a more efficient separation of amines and hydrocarbons.

SUMMARY OF THE INVENTION

One exemplary embodiment can be a process for separating at least one amine from one or more hydrocarbons for regenerating the at least one amine. The process can include passing the at least one amine after contacting with the one or more hydrocarbons from a first vessel to a second vessel. Often, the second vessel includes one or more walls surrounding one or more baffles and contains at least one coalescing zone.

Another exemplary embodiment may be a process for separating at least one amine from one or more hydrocarbons. The process may include passing the at least one amine with the one or more hydrocarbons after contacting from a first vessel to a second vessel and passing an amine phase from the second vessel to a charcoal bed. Usually, the second vessel has one or more walls surrounding one or more baffles and first and second coalescing zones.

A further exemplary embodiment can be an apparatus for removing hydrogen sulfide. The apparatus can include an amine absorber, a flash drum downstream from the amine absorber, and a charcoal bed downstream from the flash drum. Typically, the flash drum has one or more walls forming a stack containing a demister therein and a body. The body can contain first, second, and third baffles and first and second coalescing zones.

The embodiments disclosed herein can maximize the removal of hydrocarbons from a rich amine by using multiple stages of coalescing media. At one stage the coalescing media may have oleophilic properties, and can include a coated or uncoated mesh blanket, corrugated sheet media, or other accepted liquid-liquid coalescing media. In one exemplary embodiment, the coalescing media is installed at the bottom of the first vessel or amine absorber and inside a second vessel or a rich amine flash drum. Generally, two coalescing media are installed inside the rich amine flash drum to ensure sufficient coalescing of hydrocarbons even during unstable operation, such as during the initial startup, unscheduled shutdown, and flow and pressure fluctuations. Additionally, the installation of the charcoal bed, positioned after the rich amine flash drum, can also remove any soluble hydrocarbons from the circulating amine. Optionally, a coalescing media can be installed in a stack of the rich amine flash drum to minimize the amine loss and reduce corrosion in the piping. Additionally, optional coalescing media can be installed by a slops compartment to remove any amine entrained in the liquid hydrocarbons routed to slops and, therefore, reduce re-processing problems.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream. If referring to a solute in solution, e.g., one or more disulfide compounds in an alkaline solution, the term "rich" may be referenced to the equilibrium concentration of the solute. As an example, about 5%, by mole, of a solute in a solvent may be considered rich if the concentration of solute at equilibrium is about 10%, by mole.

As used herein, the term "substantially" can mean an amount of at least generally about 80%, preferably about 90%, and optimally about 99%, by mole, of a compound or class of compounds in a stream.

As used herein, the terms "absorbent" and "absorber" include, respectively, an adsorbent and an adsorber, and relates, but is not limited to, absorption, and/or adsorption.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a bolt, a staple, or a rivet; an adhesive; or a solder.

As used herein, the term "coalescer" may be a media containing an optionally coated metal mesh, glass fibers, or other material to facilitate separation of immiscible liquids of similar density.

As used herein, the term "immiscible" can mean two or more phases that cannot be uniformly mixed or blended.

As used herein, the term "phase" may mean a liquid, a gas, or a suspension including a liquid and/or a gas, such as a foam, aerosol, or fog. A phase may include solid particles. Generally, a fluid can include one or more gas, liquid, and/or suspension phases.

As used herein, the term "alkali" can mean any substance that in solution, typically a water solution, has a pH value greater than about 7.0, and exemplary alkali can include sodium hydroxide, potassium hydroxide, or ammonia. Such an alkali in solution may be referred to as "an alkaline solution" or "an alkaline" and includes caustic, i.e., sodium hydroxide in water.

As used herein, the term "parts per million" may be abbreviated herein as "ppm" and "weight ppm" may be abbreviated herein as "wppm".

As used herein, the term "mercaptan" typically means thiol and may be used interchangeably therewith, and can include compounds of the formula RSH as well as salts thereof, such as mercaptides of the formula $RS^-M^+$ where R is a hydrocarbon group, such as an alkyl or aryl group, that is saturated or unsaturated and optionally substituted, and M is a metal, such as sodium or potassium.

As used herein, the term "disulfides" can include dimethyldisulfide, diethyldisulfide, and ethylmethyldisulfide, and possibly other species having the molecular formula RSSR' where R and R' are each, independently, a hydrocarbon group, such as an alkyl or aryl group, that is saturated or unsaturated and optionally substituted. Typically, a disulfide is generated from the oxidation of a mercaptan-containing caustic and forms a separate hydrocarbon phase that is not soluble in the aqueous caustic phase. Generally, the term "disulfides" as used herein excludes carbon disulfide ($CS_2$).

As used herein, the weight percent or ppm of sulfur, e.g., "wppm-sulfur" is the amount of sulfur, and not the amount of the sulfur-containing species unless otherwise indicated. As an example, methylmercaptan, $CH_3SH$, has a molecular weight of 48.1 with 32.06 represented by the sulfur atom, so the molecule is about 66.6%, by weight, sulfur. As a result, the actual sulfur compound concentration can be higher than the wppm-sulfur from the compound. An exception is that the disulfide content in caustic can be reported as the wppm of the disulfide compound.

As used herein, the term "lean" describes a fluid having been optionally treated and desired levels of sulfur, including one or more mercaptans and one or more disulfides for treating one or more C1-C4 hydrocarbons.

As used herein, the term "regeneration" with respect to a solvent stream can mean removing one or more disulfide sulfur species from the solvent stream to allow its reuse.

As used herein, the terms "degrees Celsius" may be abbreviated "° C." and the term "kilopascal" may be abbreviated "KPa" and all pressures disclosed herein are absolute.

As depicted, process flow lines in the FIGURE can be referred to, interchangeably, as, e.g., lines, pipes, branches, distributors, streams, effluents, feeds, products, portions, catalysts, withdrawals, recycles, suctions, discharges, and caustics.

BRIEF DESCRIPTION OF THE DRAWING

The FIGURE is a schematic depiction of an exemplary apparatus for removing hydrogen sulfide.

DETAILED DESCRIPTION

The embodiments disclosed herein can provide three stages of coalescing media and a charcoal bed. After passing the first coalescing stage, the rich amine can be transferred from the bottom of the absorber column to a vessel, such as a rich amine flash drum via a distributor submerged into the rich amine phase to avoid any disturbance to the skimmed liquid hydrocarbon layer, and therefore, increase the efficacy of the second coalescing stage located in the vessel. The third coalescing stage located in a segregated rich amine compartment may allow the coalescing of any remaining hydrocarbons before the rich amine exits the rich amine flash drum. Subsequently, the rich amine can pass through a charcoal bed to remove any soluble hydrocarbons before it is routed to the amine stripper column.

Referring to the FIGURE, an apparatus 10 for separating at least one amine from one or more hydrocarbons for regenerating the at least one amine is depicted. The apparatus 10 can include an amine absorber or a first vessel 100, a second vessel or a rich amine flash drum 200, and a charcoal bed 300. Generally, the apparatus 10 can be part of a larger unit for removing one or more sulfur compounds, such as hydrogen sulfide or one or more thiol compounds from a hydrocarbon stream. Such a unit is disclosed in, e.g., U.S. Pat. No. 7,381,309.

The amine absorber 100 can have a coalescing zone 130 including an oleophilic media. The oleophilic media may include at least one of a metal mesh that is optionally coated, one or more glass fibers, sand, or anthracite coal. Desirably, the coating may be an oleophilic and/or hydrophobic coating usually suited for an aqueous phase. Such a coating may include at least one of a fluoropolymer and polypropylene. Suitable fluoropolymers can include one or more of polytetrafluoroethylene, fluorinated ethylene-propylene, perfluoroalkoxy, and ethylene tetrafluoroethylene. Exemplary fluoropolymers are disclosed in, e.g., U.S. Pat. Nos. 5,456,661 and 2,230,654. The vessel 100 can receive a hydrocarbon stream 50, including one or more $C4^-$ hydrocarbons, such as liquefied petroleum gas and/or fuel gas, below the coalescing zone 130. Generally, the hydrocarbon stream 50 may be rich in or substantially has one or more $C4^-$ hydrocarbons. The hydrocarbon stream 50 may be one or more liquids, gases, or a mixture of one or more gases and liquids.

An amine stream 60, including at least one amine, such as at least one of monoethanolamine, diethanolamine, and methyl diethanolamine, preferably monoethanolamine and/or diethanolamine, can be provided to the amine absorber 100. Typically the amine is comprised by about 15—about 40%, preferably about 10—about 20%, by weight, in solution with the balance being water. The hydrocarbons in the vessel 100 can rise and pass through the oleophilic media in the coalescing zone 130 and pass to the upper portion of the vessel 100. The amine stream 60 can drop to the bottom of the vessel 100 and contact the hydrocarbons to remove hydrogen sulfide. Thus, a hydrocarbon phase 110 and an amine phase 150 may be formed within the vessel 100.

The conditions within the amine absorber 100 can include a temperature of about 0—about 100° C. and pressure of about 100—about 800 KPa. Generally, about 10—about 25 moles of amine for each mole of combined hydrogen sulfide and carbon dioxide to be removed. Typically, the hydrocarbon stream 50 can contain about 1,000—about 2,000 ppm, by weight, hydrogen sulfide that may be reduced to no more than about 15 ppm, by weight. Additionally, carbon dioxide or other acid gases that are possibly present in the hydrocarbon stream 50 may also react with the amines and are absorbed into the amine effluent stream leaving the amine absorber vessel. Such an amine absorber vessel is described in, e.g., U.S. Pat. No. 7,381,309. A hydrocarbon stream 114 can be withdrawn from the vessel 100 and be further processed to remove, e.g., one or more thiol compounds, by treating in prewash and extraction zones. Such zones are disclosed in, e.g., U.S. Pat. No. 7,381,309.

An amine stream 154 rich in sulfur compounds, such as one or more thiol amides, can be provided via a distributor in a rich amine flash drum or second vessel 200, which can contain two immiscible liquid phases and a gas phase. The rich amine flash drum 200 can have a substantially vertical stack 220 formed integrally with a body 240. The stack 220 can contain a demister 224 therein. The demister 224 can be any suitable demister, and may include one or more vanes or a mesh made of any suitable material, such as metal including stainless steel. The stack 220 can receive a lean amine stream 228. The body 240 can contain one or more baffles 242, such as a first baffle 248, a second baffle 262, and a third baffle 268, and at least one coalescing zone 244 having a first coalescing zone 254 and a second coalescing zone 274 that may be surrounded by one or more walls 210. The baffles 248, 262, and 268 can be any suitable barrier that causes a liquid to flow around the barrier. The baffles 248, 262, and 268 and the coalescing zones 254 and 274 may extend across the entire width of the body 240 creating enclosures 258, 278, 280, and 284. Generally, the enclosure 258 is at least partially formed by the first baffle 248 and the first coalescing zone 254. Usually, the another enclosure 278 can be adjacent to the enclosure 258 and is at least partially formed by the first and second coalescing zones 254 and 274. The further enclosure 280 may be adjacent to the enclosure 278 and can be bordered by the second coalescing zone 274 and the one or more walls 210. The yet another enclosure 284 may be adjacent to the enclosure 258 and be defined by the first baffle 248 and the one or more walls 210. All the enclosures 258, 278, 280, and 284 can be bound on at least one side by the one or more walls 210. The first and second coalescing zones 254 and 274 can include, independently, one or more oleophilic media as described above for the coalescing zone 130.

The amine phase 150 can exit as an amine stream 154 and enter the rich amine flash drum 200 and gases can separate from the liquids to form a gas phase 294. The gas phase 294 can typically include one or more $C_4^-$ hydrocarbons that may pass through the demister 224 resulting in the coalescing of any liquids entrapped therein. Moreover, the gas phase 294 rising in the stack 220 may be washed with the lean amine stream 228. A gas stream 298 of hydrocarbons can exit the stack 220 and be routed to any suitable destination, including a fuel gas header.

The liquids from the streams 154 and 228 can collect in the enclosure 258. A lighter hydrocarbon phase 292 can separate from a heavier amine phase 288. The hydrocarbon phase 292 can pass over the first baffle 248 and collect in the enclosure 284. A slop oil stream 286 can be withdrawn and be sent to storage for further optional processing, such as sending the hydrocarbons back to the crude distillation tower. Another slop stream 306 may be withdrawn from the enclosure 280, as further described, and to skim hydrocarbons on top of the amine phase 288. The another slop stream 306 may be sent to the same destination as the slop oil stream 286.

The amine phase 288 can pass through the first coalescing zone 254 resulting in the coalescing of hydrocarbon droplets that rise to the hydrocarbon phase 292. The amine phase 288 may pass under the second baffle 262 and over the third baffle 268, aiding in the separation of hydrocarbon droplets from the amine phase 288. The amine phase 288 may pass through the second coalescing zone 274, resulting in the coalescing of still more hydrocarbon droplets. Additional hydrocarbons can be skimmed as from the hydrocarbon phase 292 as a slop hydrocarbon stream 306. The amine phase 288 can accumulate in the enclosure 280 prior to exiting as rich amine stream 296.

The rich amine stream 296 can be passed to the charcoal bed 300 including activated charcoal to remove any remaining hydrocarbons before exiting as an amine stream 310. A line 304 and a valve 308 can be present to bypass the charcoal bed 300 during replacement of the activated charcoal. Alternatively, a plurality of charcoal beds may be used in any suitable configuration, such as lead-lag. The amine stream 310, which is typically rich in one or more thiol amides, can be regenerated to be returned as lean amine streams 60 and 228. Such a regeneration zone can include a stripper, among other equipment, and an exemplary amine regeneration zone is disclosed in, e.g., U.S. Pat. No. 4,461,749.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for separating at least one amine from one or more hydrocarbons for regenerating the at least one amine, comprising:
    passing the at least one amine after contacting with the one or more hydrocarbons from a first vessel to a second vessel wherein the second vessel comprises one or more walls surrounding one or more baffles and contains at least one coalescing zone;
    wherein the one or more baffles comprises a first baffle, a second baffle, and a third baffle, and the at least one amine passes to an enclosure at least partially formed by the first baffle.

2. The process according to claim 1, wherein the at least one coalescing zone comprises a first coalescing zone and second coalescing zone.

3. The process according to claim 1, wherein the at least one coalescing zone comprises at least one of a mesh and one or more vanes.

4. The process according to claim 1, wherein the at least one coalescing zone comprises a mesh wherein the mesh comprises an oleophilic coating.

5. The process according to claim 2, wherein the first coalescing zone and second coalescing zone comprise, independently, at least one of a mesh and one or more vanes.

6. The process according to claim 2, wherein each of the first coalescing zone and second coalescing zone comprise a mesh comprising an oleophilic coating.

7. The process according to claim 1, wherein the second vessel forms a stack containing a demister therein.

8. The process according to claim 7, further comprises providing a lean amine stream to the stack.

9. The process according to claim 2, wherein the enclosure is at least partially formed by the first baffle and the first coalescing zone.

10. The process according to claim 9, wherein another enclosure is formed adjacent to the enclosure and the another enclosure is at least partially formed by the first coalescing zone and second coalescing zone.

11. The process according to claim 10, wherein the another enclosure contains the second and third baffles.

12. The process according to claim 10, further comprising passing the at least one amine to the enclosure wherein an amine phase passes from the enclosure to the another enclosure past the second and third baffles to a further enclosure, and a hydrocarbon phase passes from the enclosure to yet another enclosure before exiting the vessel.

13. The process according to claim 12, further comprising passing the amine phase from the vessel to a charcoal bed for absorbing one or more hydrocarbons.

14. A process for separating at least one amine from one or more hydrocarbons, comprising:
   A) passing the at least one amine with the one or more hydrocarbons after contacting from a first vessel to a second vessel wherein the second vessel comprises one or more walls surrounding one or more baffles and first and second coalescing zones, wherein the one or more baffles comprises a first baffle, a second baffle, and a third baffle, and the at least one amine passes to an enclosure at least partially formed by the first baffle; and
   B) passing an amine phase from the second vessel to a charcoal bed.

15. The process according to claim 14, wherein each of the coalescing zone, the first coalescing zone, and the second coalescing zone comprises a mesh wherein the mesh comprises an oleophilic coating.

16. The process according to claim 14, wherein the second vessel forms a stack containing a demister therein and further comprises sending a lean amine stream to the stack.

17. The process according to claim 14, wherein the second vessel forms an enclosure at least partially formed by the first baffle and the first coalescing zone.

18. The process according to claim 14, wherein the amine comprises an alkanolamine, in turn comprising at least one of monoethanolamine, diethanolamine, and methyl diethanolamine.

* * * * *